United States Patent [19]

Ryan et al.

[11] Patent Number: 4,530,911
[45] Date of Patent: Jul. 23, 1985

[54] HYDRODENITRIFICATION CATALYST

[75] Inventors: Robert C. Ryan; Charles T. Adams, both of Houston; Don M. Washecheck, Katy, all of Tex.

[73] Assignee: Shell Oil Company, Houston, Tex.

[21] Appl. No.: 611,574

[22] Filed: May 18, 1984

[51] Int. Cl.$^3$ .................. B01J 29/06; B01J 27/18
[52] U.S. Cl. .................. 502/74; 502/210; 502/211
[58] Field of Search .......... 502/210, 211, 162, 74, 502/66

[56] References Cited

U.S. PATENT DOCUMENTS

| | | | |
|---|---|---|---|
| 3,629,146 | 12/1971 | Adams | 502/210 |
| 3,965,041 | 6/1976 | van Klinken et al. | 502/210 X |
| 4,407,726 | 10/1983 | Rizkalla | 502/162 X |
| 4,444,906 | 4/1984 | Callahan et al. | 502/211 |
| 4,446,248 | 5/1984 | Simpson et al. | 502/211 |

FOREIGN PATENT DOCUMENTS 1357918  6/1974  United Kingdom ............... 502/211

Primary Examiner—Carl F. Dees

[57] ABSTRACT

A method is disclosed for preparing a supported hydrogenation metal catalyst containing one each of Mo or W and of Co and/or Ni incorporated into a suitable support. An aqueous impregnating solution containing the desired quantity of catalytically active metals and having a pH in the range of about 0.7–2.7 is prepared containing (1) at least one each of a soluble compound of molybdenum or tungsten and a compound of cobalt and/or nickel; (2) a solubilizing amount of about 0.2–1.0 mole of phosphorous per mole Mo or W; and (3) about 2–6% w basis support, of a suitable soluble amine compound, such as amine alcohols, polyamines and amine acids. A suitable support, e.g., alumina, silica or silica-alumina, is then impregnated with the metals-containing solution. After impregnation the support is dried and calcined. This preparation method significantly increases the hydrodenitrification activity of the resulting catalyst in a hydrocarbon hydroconversion process.

21 Claims, No Drawings

HYDRODENITRIFICATION CATALYST

BACKGROUND OF THE INVENTION

This invention relates to a method for preparing a supported hydroconversion catalyst, particularly with respect to improved hydrodenitrification (HDN) activity.

Considerable research has been undertaken to develop and commercialize new, cost effective, highly active hydroconversion catalysts for large volume first stage hydrocracking and catalytic cracking feed hydrotreater applications. The inclusion of significant amounts of 1000° F.+ residual components, including cracked stocks, in the hydrocarbon feeds to these processes has created severe activity and stability problems for the catalysts currently used commercially in these applications.

Commercial hydrodenitrification catalysts are well known. Currently the most active are Ni—Mo, Ni—W, and Co—mo supported on a gamma alumina carrier. The activity of these catalysts has been enhanced by the addition of phosphorus as a promoter. Haresnape, et al U.K. No. 701217 (1953), which is incorporated herein by reference, relates to an increase in hydrodesulfurization activity with the addition of phosphorus in the form of cobalt phosphomolybdate. Housam, et al U.K. No. 807583 (1959) relates to the promoting effect of phosphorus in improving hydrogenation activity for both Co—Mo/Al$_2$O$_3$ and Ni—W/Al$_2$O$_3$ catalysts.

While multiple impregnations can be used in preparing catalysts, a single step impregnation is desired. To obtain efficient impregnation and uniform distribution of metal on support, the metals must be maintained in solution during impregnation. Methods to maintain high concentrations of metals in solution are well known. Adams, U.S. Pat. No. 3,629,146, which is incorporated herein by reference, relates to a method for preparing a supported catalyst containing a molybdenum metal concentration in excess of 12%w (as metal), basis finished catalyst, in a single aqueous impregnation from a stabilized solution. To obtain efficient impregnation and uniform distribution of metal on a support, the metals must be maintained in solution during the impregnation. Precipitation of metals from the impregnating solution leads to non-uniform impregnation and loss of effectiveness of the deposited metal. Adams discloses that high concentrations of active molybdenum can be impregnated into a support by adding stabilizing amounts of hydrogen peroxide and phosphoric acid to the impregnating solution. We have found that hydrogen peroxide is not needed for all impregnating solutions since it is a solubilizing agent that permits increased molybdenum contents in phospho-molybdenum solutions.

Gardner et al, U.S. Pat. No. 2,946,739, which is incorporated herein by reference, discloses that a "conventional" method of preparing a Co—Mo/Al$_2$O$_3$ hydrocracking catalyst includes impregnation with an aqueous solution of (NH$_4$)$_6$Mo$_7$O$_4$.4H$_2$O in a 50/50 mixture of ethanolamine and water. The partially impregnated catalyst is then dried, calcined and impregnated in a second step with an aqueous solution of Co(NO$_3$)$_2$ and Rh(NO$_3$)$_3$. We have found that the combination of high concentrations of amine with phosphomolybdenum compounds causes unstable solutions, i.e., precipitation of metal compounds or mal-distribution of metals in the carrier.

During a study of various catalyst preparation methods we found that low concentrations of certain amine compounds which are soluble in the impregnation solution, such as amine alcohols, polyamines, and amine acids, in combination with at least one each of compounds of molybdenum or tungsten and of nickel or cobalt plus a phosphorus compound can be used to produce a stable impregnating solution. Typical amine alcohols are ethanolamine, propanolamines, butanolamines, diethanolamines, 2,2-diamino-1,3-propandiol, 2,2,3-triamino-1-propanol or triethanolamine. A typical polyamine is ethylenediamine. Typical amine acids are glycine and nitrilotriacetic acid. Hydrogen peroxide may also be used to aid in solution preparation, in some cases. Surprisingly we found that the HDN activity of a catalyst prepared with a solution containing both a phosphorus compound and an amine compound was more than 19% greater than a catalyst prepared with only a phosphorus compound. The amount of amine compound needed in this case was also substantially less than that taught in the prior art (see Gardner et al, U.S. Pat. No. 2,946,739). A catalyst prepared with only the amine compound and no phosphorus compound would be considerably less active for hydrodenitrification than the catalyst containing both phosphorus and amine.

SUMMARY OF THE INVENTION

A method is disclosed for preparing supported hydroconversion catalysts containing one each of molybdenum or tungsten and of cobalt and/or nickel, incorporated into a suitable support, preferably in a single impregnation. The method comprises (a) preparing an aqueous impregnating solution having a pH in the range of about 0.7–2.7 comprising: mixing at least one each of a compound of molybdenum or tungsten and of cobalt and/or nickel; a stabilizing amount of from about 0.2–1.0 mole of phosphorus per mole of Mo or W; and from about 2–6%w, basis support, of a suitable soluble amine compound; (b) impregnating a suitable catalyst support with said solution; and (c) drying and calcining the composite.

To improve the HDN activity of the catalyst the impregnating solution must be stable, but also must achieve uniform distribution of metals into the support. To prevent deposition of metals on the surface of the support the impregnating solution pH (at 100° F.) must be lower than 2.7. If the pH gets too low, i.e., below about 0.7, MoO$_3$ and PO$_4$ form an adduct which does not distribute evenly over the support. Preferably, the pH should be maintained between 1.2 and 2.5 (at 100° F.). The solution is then used for impregnating the support with the desired quantity of catalytically active metals. The impregnated support is then dried and calcined. The method is particularly applicable to catalysts containing from about 2.5–4%w nickel or cobalt and from about 10–16%w molybdenum or about 10–32%w tungsten supported on activated gamma alumina.

DETAILED DESCRIPTION OF THE INVENTION

According to the present invention it has been found that the combination of certain soluble amine compounds and certain phosphorus compounds, preferably phosphoric acid, not only effectively stabilizes the impregnation solution, but also substantially enhances the catalytic activity of the finished catalyst. The reason for the enhanced activity of the catalyst is not known, but it is believed that better dispersion of metals is obtained by combining certain phosphorus and amine compounds.

As previously mentioned, the conditions necessary to produce high concentrations of hydrogenation metals on a catalyst support in the desired amount, while maintaining high activity, are quite critical. It is presently felt that the most critical process conditions are the soluble amine compound/support weight ratio and the P/MoO3 weight ratio. The percentage of soluble amine compound/support necessary to achieve this result in the system herein described must be within the range from about 2% to 6%w. We have observed that amounts less than about 2%w do not produce the desired increase in catalyst activity while amounts greater than about 6%w do not enhance activity above that found with 6%w amine. The amount of phosphorus, as such, should be in the range of about 0.2 to 1.0 mole/-mole of molybdenum or tungsten.

To obtain the desired pH range of about 0.7 to 2.7 in the impregnating solution or, preferably of about 1.2 to 2.5, a number of techniques may be employed. A suitable impregnating solution can be prepared by combining a molybdenum solution containing ammonia and/or ammonium hydroxide plus a suitable soluble amine compound with a nickel solution containing phosphoric acid.

The amount of ammonia and/or ammonium hydroxide added to a slurry of $MoO_3$ in water is usually in the amount of 6 moles of $NH_3$ or $NH_4OH$ for every 7 moles of $MoO_3$ in order to solubilize the $MoO_3$. The soluble amine compound can also be added to this solution, although some of the basic amines such as monoethanolamine, propanolamine, and ethylene diamine may be substituted, on a mole-for-mole basis, for the ammonia and/or ammonium ions. A preferred method for preparing the molybdenum solution consists of adding hydrogen peroxide to the impregnating solution in the range of 0.1 to 1.0 mole of hydrogen peroxide/mole of molybdenum.

The nickel solution consists of nickel salts dissolved in water and phosphoric acid. A wide range of nickel compounds are suitable such as nickel nitrate, nickel acetate, nickel formate, nickel sulfate, nickel oxide, nickel phosphate, nickel carbonate, nickel chloride, nickel hydroxide. Two compounds that are especially useful are nickel nitrate and nickel carbonate. The amounts of nickel salts and ammonia or ammonium hydroxide plus the suitable soluble amine compound are varied to obtain the desired nickel content at a final pH in the desired range, especially between about 1.2 to 2.5 (at 100° F.).

This invention is especially applicable to supported hydroconversion catalysts which contain at least one each of cobalt and/or nickel and of molybdenum or tungsten incorporated into a support. Typically such catalysts will contain from about 1 to 5%w cobalt and/or nickel, and particularly from about 2.5–4%w Co and/or Ni and from about 10 to 16%w molybdenum or 10 to 32%w tungsten.

Any of the usual catalyst supports are thought to be suitable for the invention. Suitable supports for the catalysts of the invention include refractory oxides, such as alumina, silica and mixtures thereof. Crystalline synthetic zeolites such as aluminosilicates, iron silicates, gallium silicates, magnesia, titania and mixtures thereof may also be used as supports, preferably in combination with refractory oxide supports. A particularly preferred support is activated gamma-alumina.

A substantial increase in the HDN activity, relative to commercial catalysts, is required to commercialize a new hydrotreating catalyst. In an effort to develop such an improved catalyst, many experimental catalysts were prepared and tested for HDN activity. The activity test used in the testing program is designed to measure denitrification by using a standard hydrocarbon feedstock and a standard set of conditions, including temperature, pressure, gas flow and liquid flow, for each catalyst. A standard catalyst is tested under the same conditions as the experimental catalysts. The first order denitrification rate constant of the standard catalyst is defined as 1.00 and the activities of all experimental catalysts are measured relative to this standard. This method was used to determine the HDN improvement as shown in the Examples herein.

Suitable hydroconversion conditions for the processes using improved catalysts according to the present invention are as follows: a temperature of 350°–420° C.; a total pressure of 75–200 bar; a partial hydrogen pressure of 60–200 bar; a space velocity of 0.4–1.5 kg oil/1 catalyst/hour; and a hydrogen feed rate of 250–2500 Nl/kg oil feed. The hydrodenitrification of heavy oil feed according to the present process is preferably carried out under the following conditions: a temperature of 260°–410°; a total pressure of 100–150 bar; a partial hydrogen pressure of 80–150 bar; a space velocity of 0.4–1.0 kg oil/1 catalyst/hour; and a hydrogen feed rate of 500–1500 Nl/kg oil feed.

The hydrogen applied can be pure hydrogen or a hydrogen-containing gas, preferably one comprising more than 70% of hydrogen. The hydrogen-containing gas may also contain up to about 10% of hydrogen sulfide.

The invention will now be clarified by the following examples, which are intended to illustrate the invention and are not to be regarded as a limitation thereof.

EXAMPLE 1

Catalyst A was prepared with concentrations of 3.0%w Ni/13.0%w Mo/3.2%w P supported on a gamma alumina carrier. A dry pore volume impregnation technique was used such that the support pores were just filled with a solution of the various salts. A solution suitable for impregnating 200 gm of alumina with a pore volume of 0.75 cc/g was prepared as follows:

Nickel nitrate hexahydrate (26.0 gm) was dissolved in an 85% solution of phosphoric acid (34.8 gm) and enough distilled water to provide approximately 50 ml of a first solution. To this solution was added 6.9 gm nickel carbonate (51.2%w Ni). The solution was stirred and heated gently (~100° F.) until all solids were dissolved, thereby providing approximately 60 ml of solution number 1. A second solution was made by mixing 13.4 ml of 30% hydrogen peroxide, 50 ml of distilled water and 53.8 gm ammonium heptamolybdate. The mixture was gently heated (~100° F.) until all solids were dissolved. To this was added 13.2 gm of molybdenum trioxide and 5.6 gm of 1-amino-2-propanol. The heating and stirring was continued until a clear yellow solution was obtained. When both solutions were at or near ambient temperature, solution number 2 was slowly added to solution number 1, while stirring. After cooling to approximately 90° F. and diluting to 150 ml with water, the solution had a pH of about 2.2 (100° F.). It was then added to a gamma alumina support in several small portions with intermediate agitation. The impregnated support was further agitated 15-30 minutes, dried for 2 hours at 250° F. and calcined in air for 2 hours at 900° F.

Reference Catalyst B was prepared in the same manner as Catalyst A, except that ammonium heptamolybdate was used for the entire source of molybdenum and no additional amine compound was added. This impregnating solution had a pH of about 1.8 (at 100° F.). Both catalysts were used to hydrotreat a sample of catalytically cracked heavy gas oil (CCHGO) having feed properties shown in Table 1. Both catalysts were sulfided before the hydrotreating tests began by treatment with a $H_2/H_2S$ (5%v $H_2S$) gaseous mixture at a temperature of 700° F. for 2 hours.

Catalyst A, which included 1-amino-2-propanol in the impregnating solution, showed an increase in HDN activity of 19% relative to the reference Catalyst B.

EXAMPLE 2

Catalyst C was prepared in a manner identical to Catalyst A except that the molybdate solution was prepared with 69.9 gm of ammonium heptamolybdate (no molybdenum trioxide) and 5.6 gm of nitrilotriacetic acid was substituted for 5.6 gm of 1-amino-2-propanol. The pH of the impregnation solution was 1.5 (at 100° F.).

Catalyst C, which included nitrilotriacetic acid, showed an increase in HDN activity of 22% relative to reference Catalyst B.

EXAMPLE 3

Catalyst D was prepared in a manner identical to Catalyst C, except that 7.0 gm of glycine was substituted for the nitrilotriacetic acid. The pH of the impregnation solution was 2.3 (at 100° F.).

Catalyst D, which included glycine, showed an increase of 19% in HDN activity relative to reference Catalyst B.

EXAMPLE 4

In order to demonstrate the necessity of having a suitable amine function as part of the promoter a water soluble additive containing an alcohol function was tested. Catalyst E was prepared in a manner identical to Catalyst C, except that 5.6 gm of ethylene glycol was substituted for the nitrilotriacetic acid. The pH of the inpregnating solution was 1.9 (at 100° F.).

Catalyst E, which included ethylene glycol, had an activity that was within the experimental limits of being the same as reference Catalyst B.

EXAMPLE 5

In order to demonstrate the very high metal loadings that can be obtained in a single impregnation solution containing both phosphoric acid and a soluble amine compound, Catalyst F was prepared with metal loadings of 3.5%w Ni—15.0%w Mo—3.2%w P, as follows:

Nickel nitrate hexahydrate (29.5 gm) was dissolved in an 85% solution of phosphoric acid (36.8 gm) and enough distilled water to provide approximately 50 ml of solution. To this was solution added 9.5 gm nickel carbonate (51.2%w Ni). The resulting slurry was stirred and heated gently (~100° F.) until all solids dissolved, thereby providing approximately 60 ml of a first solution.

A second solution, with a volume of about 80 ml was made by mixing 30% hydrogen peroxide (12.5 ml), 50 ml of distilled water and ammonium heptamolybdate (65.3 gm). The slurry was gently heated (~100° F.) until all solids dissolved. To this was added 16.2 gm of molybdenum trioxide and 5.6 gm of monoethanolamine. The heating and stirring were continued until a clear yellow solution was obtained.

With both solutions at or near ambient temperature, the second solution was slowly added to the first solution while stirring. The combined solution was then cooled to approximately 90° F. and diluted to 150 ml. A clear stable solution was obtained, having a pH of 2.0 (at 100° F.). It was then added to a gamma-alumina support in several small portions with intermediate agitation. The impregnated support was then further agitated 15-30 minutes. The resulting catalyst pellets were uniformly impregnated. The catalyst was dried at 250° F. for 2 hours and calcined at 900° F. for 2 hours. Catalyst F was tested by the same procedure as Catalyst B and was found to be 23% more active for denitrification than reference Catalyst B (Table 1).

Catalyst G with the same high metal and phosphorus loadings of Catalyst F, but without the addition of a soluble amine compound to the impregnating solution was also prepared. However, upon impregnation, metals from the solution partially precipitated on the outside of the support causing a non-uniform distribution of metals. Upon calcination the catalyst pellets were covered with "dust" that was primarily molybdenum oxide. This catalyst was unsuitable for comparative testing.

TABLE 1

CCHGO Test Results

Conditions: 850 psig $H_2$; 650° F.; $H_2$/oil - 4.0; 16-45 mesh catalyst.
Feed Properties: 88.99% C, 9.68% H; 1.28% S; 482 ppm N.
Support Loadings: 3.0% w Ni - 13.0% w Mo - 3.2% w P

| Catalyst | Additive (gm/100 gm of support) | Solution pH (at 100° F.) | Relative Denitrification Activity |
|---|---|---|---|
| B | — | 1.8 | 1.00 ± 0.10 |
| A | 1-amino-2-propanol (2.8) | 2.2 | 1.19 |
| C | nitrilotriacetic acid (2.8) | 1.5 | 1.22 |
| D | glycine (3.5) | 2.3 | 1.19 |
| E | ethylene glycol (2.8) | 1.9 | 1.08 |
| F* | monoethanol amine (2.8) | 2.0 | 1.23 |

|  | % w | % w | % w |
|---|---|---|---|
| *Support Loading | 3.5 Ni | 15 Mo | 3.2 P |

What is claimed is:

1. A method for preparing supported hydroconversion catalysts containing one each of molybdenum or tungsten and of cobalt and/or nickel incorporated into a suitable support which comprises: (a) preparing an aqueous impregnating solution having a pH in the range of about 0.7-2.7 comprising mixing at least one each of a compound of molybdenum or tungsten and of cobalt and/or nickel, a stabilizing amount of from about 0.2-1.0 mole of phosphorus per mole of Mo or W and from about 2-6%w, basis support, of a suitable soluble amine compound; (b) impregnating a suitable catalyst support with said solution; and (c) drying and calcining the composite.

2. The method of claim 1 wherein said impregnating solution has a pH (at 100° F.) in the range of about 1.2-2.5.

3. The method of claim 1 wherein said support is selected from the group consisting of alumina, silica and mixtures thereof.

4. The method of claim 3 wherein said support also contains a crystalline silicate zeolite.

5. The method of claim 3 wherein said support is activated gamma alumina.

6. The method of claim 5 wherein said support contains nickel and molybdenum as hydrogenation metals.

7. The method of claim 3 wherein said support contains cobalt and molybdenum as hydrogenation metals.

8. The method of claim 6 wherein said hydroconversion catalyst contains from about 2.5–4%w nickel and from about 10–16%w molybdenum.

9. The method of claim 7 wherein said hydroconversion catalyst contains from about 2.5–4%w cobalt and from about 10–16%w molybdenum.

10. The method of claim 8 wherein said impregnating solution also contains from 0.1 to 1 mole of hydrogen peroxide per mole of molybdenum.

11. The method of claim 9 wherein said impregnating solution also contains from 0.1 to 1 mole of hydrogen peroxide per mole of molybdenum.

12. The method of claim 10 wherein said suitable soluble amine compound is selected from the group consisting of amine alcohols, polyamines and amine acids.

13. The method of claim 11 wherein said suitable soluble amine compound is selected from the group consisting of amine alcohols, polyamines and amine acids.

14. The method of claim 1 wherein said suitable soluble amine compound is selected from the group consisting of monoethanolamine, 1-amino-2-propanol, 3-amino-1-propanol, glycine and nitrilotriacetic acid.

15. The method of claim 8 wherein said amine compound is selected from the group consisting of monoethanolamine, 1-amino-2-propanol, glycine, and nitrilotriacetic acid.

16. A hydroconversion catalyst composition comprising one each of molybdenum or tungsten and of cobalt and/or nickel on a suitable support prepared by the method which comprises: (a) preparing an aqueous impregnating solution having a pH in the range of about 0.7–2.7 comprising: mixing at least one each of a compound of molybdenum or tungsten and of cobalt and/or nickel, a stabilizing amount of from about at least 0.2–1.0 mole of phosphorus per mole of Mo or W, and from about 2–6%w, basis support, of a suitable soluble amine compound; (b) impregnating a suitable catalyst support with said solution; and (c) drying and calcining the composite.

17. The catalyst composition of claim 16 wherein said solution has a pH (at 100° F.) in the range of 1.2–2.5; the support is selected from the group consisting of alumina, silica and mixtures thereof; and said mixture contains nickel and molybdenum as hydrogenation metals.

18. The catalyst composition of claim 17 wherein the nickel content is from about 2.5–4%w and the molybdenum content is from about 10–16%w, basis catalyst.

19. The catalyst composition of claim 16 wherein said solution has a pH (at 100° F.) in the range of 1.2–2.5; the support is selected from the group consisting of alumina, silica and mixtures thereof; and said mixture contains cobalt and molybdenum as hydrogenation metals.

20. The catalyst composition of claim 18 wherein said solution also contains from 0.1 to 1 mole of hydrogen peroxide per mole of molybdenum; said phosphorus compound is phosphoric acid; and said suitable soluble amine is selected from the group consisting of amine alcohols, polyamines and amine acids.

21. The catalyst composition of claim 20 wherein said support is gamma alumina and said amine compound is selected from the group consisting of monoethanolamine, 1-amino-2-propanol, 3-amino-1-propanol, nitrilotriacetic acid and glycine.

* * * * *